United States Patent [19]

Billeter

[11] 4,436,116
[45] Mar. 13, 1984

[54] FOUR-WAY VALVE

[75] Inventor: Henry R. Billeter, Marco Island, Fla.

[73] Assignee: Sloan Valve Company, Franklin Park, Ill.

[21] Appl. No.: 295,833

[22] Filed: Aug. 24, 1981

[51] Int. Cl.³ .................. F16K 11/08; F16K 5/14
[52] U.S. Cl. .................. 137/625.47; 251/172; 251/177; 251/93; 251/96
[58] Field of Search .................. 251/172, 93, 96, 177; 137/625.47

[56] References Cited

U.S. PATENT DOCUMENTS

| | | | |
|---|---|---|---|
| 2,652,226 | 9/1953 | Huff | 251/96 |
| 3,269,692 | 8/1966 | Shafer | 251/172 |
| 3,386,699 | 6/1968 | Petter et al. | 251/172 X |
| 3,827,671 | 8/1974 | Bolden et al. | 251/172 X |
| 4,232,709 | 11/1980 | Zoric | 137/625.47 |

FOREIGN PATENT DOCUMENTS 1064308  8/1959  Fed. Rep. of Germany ...... 251/177

Primary Examiner—Arnold Rosenthal
Attorney, Agent, or Firm—Kinzer, Plyer, Dorn & McEachran

[57] ABSTRACT

A four-way valve for use in a railroad air brake system has a housing with an internal chamber and a plurality of ports in communication with the chamber. Two of the ports are adapted for connection to a railroad car brake pipe with an intermediate port being adapted for connection to the railroad car air brake system. A valve member is movable within the chamber between a plurality of positions, there being a position to close each port and a neutral position in which all ports are in communication with the chamber. The improvement is specifically directed to a seal member carried by the valve member and spring means which urge the seal member outwardly of the valve member and toward the described ports. Each port has seal means which include a floating seal ring within each port, with each floating seal ring being positioned for sealing contact with the valve member seal member.

4 Claims, 11 Drawing Figures

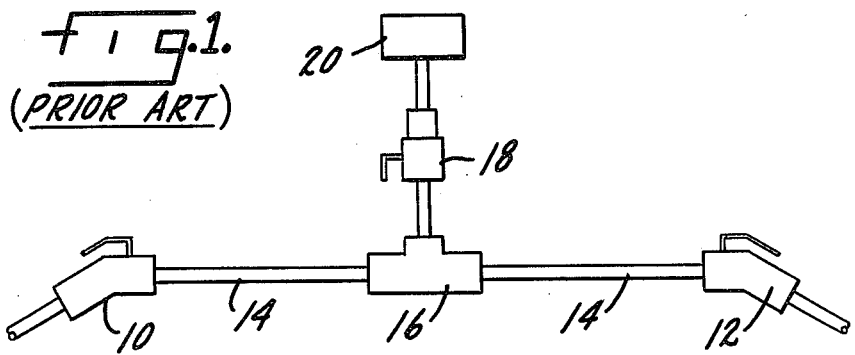
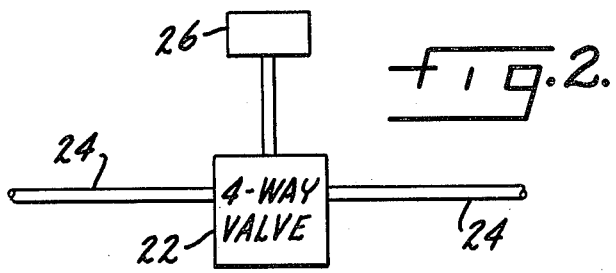
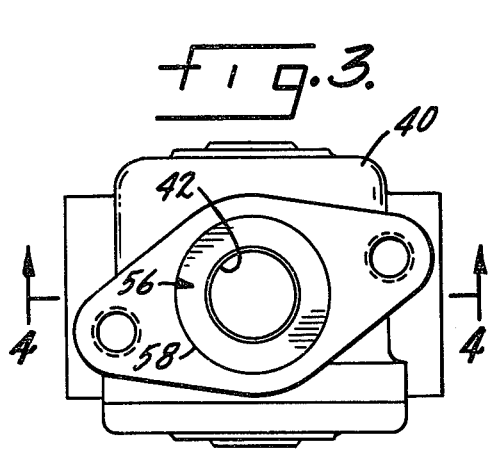
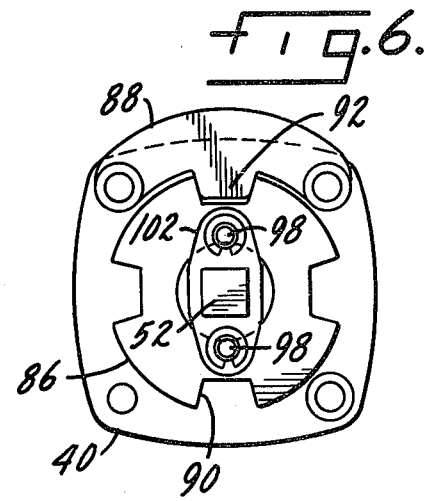
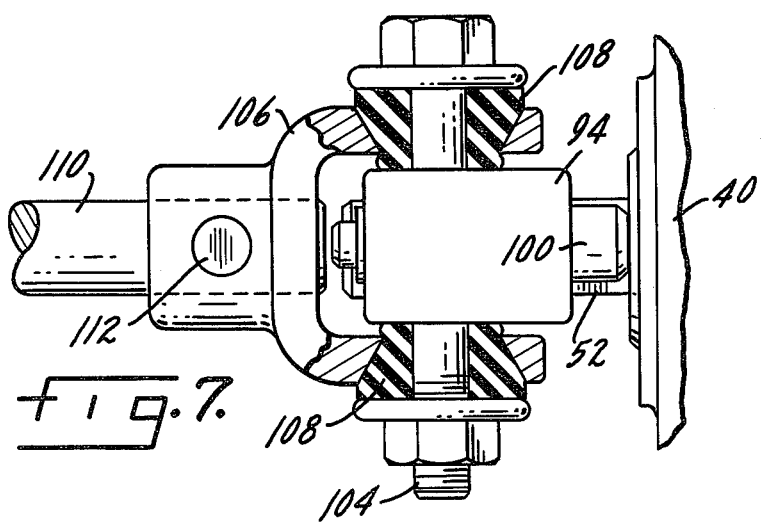

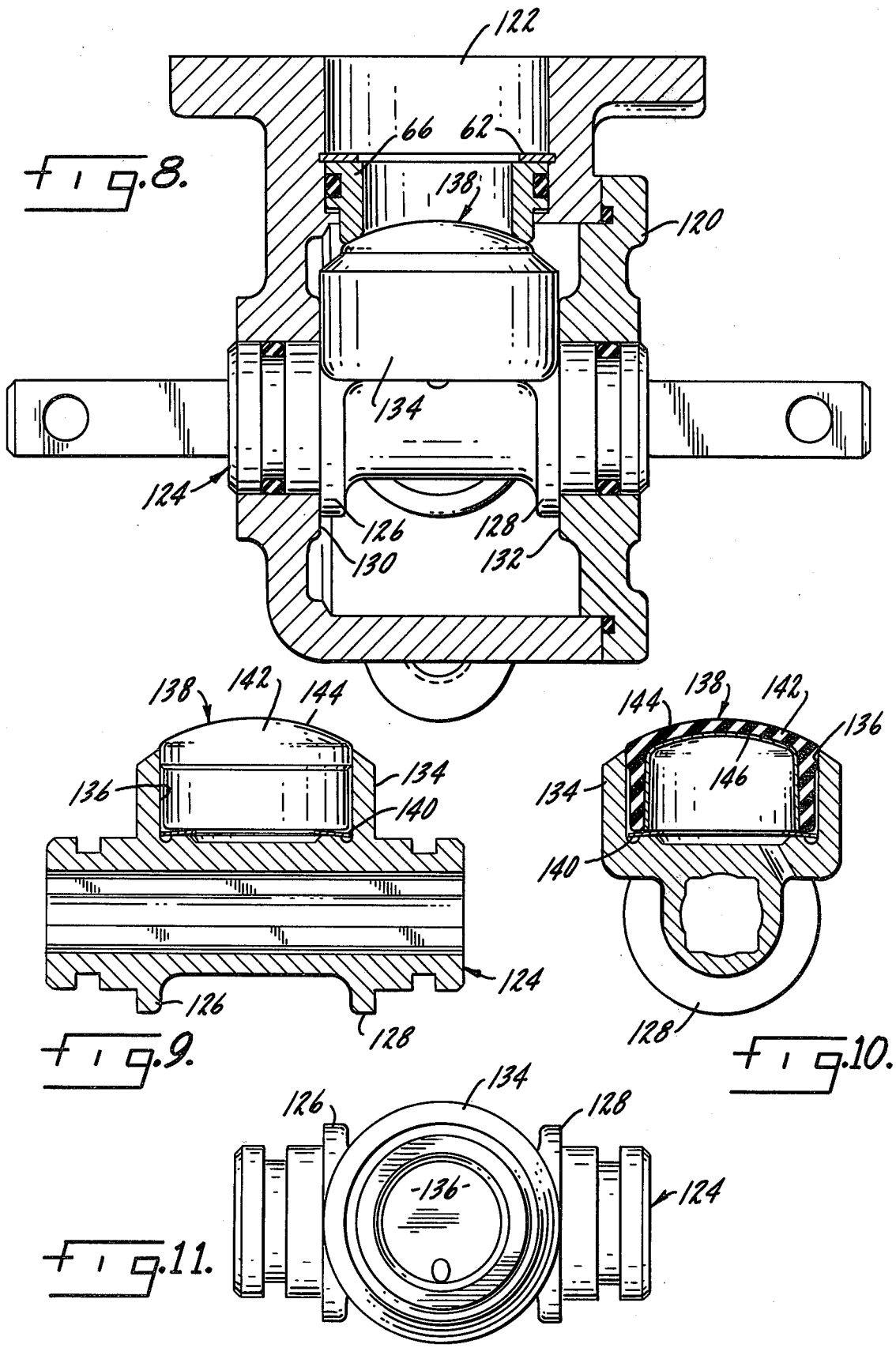

FOUR-WAY VALVE

SUMMARY OF THE INVENTION

The present invention relates to railroad car air brake systems and in particular to a four-way valve usable therein. The valve described herein replaces, on a railroad car air brake system, the customary pair of angle cocks, the dirt collector and cut-out cock and the brake pipe T connection.

A primary purpose of the invention is a four-way valve of the type described including an improved seal between a movable valve member and the various port seals.

Another purpose is a four-way valve of the type described in which the seal between the ports and the movable valve member is effective regardless of pressure differentials between the interior of the valve and exterior portions of the brake system.

Another purpose is a four-way valve of the type described including improved means for positioning the valve at any desired location and for releasing the valve for movement from one position to another.

Another purpose is a four-way valve of the type described which is operable from either side thereof whereby the valve may be operated from either side of a railroad car.

Other purposes will appear in the ensuing specification, drawings and claims.

BRIEF DESCRIPTION OF THE DRAWINGS

The invention is illustrated diagrammatically in the following drawings wherein:

FIG. 1 is a diagrammatic prior art illustration of the customary components in a railroad car air brake system, FIG. 2 is a similar diagrammatic illustration of a railroad car air brake system, but with a four-way valve substituted for the replaced components, FIG. 3 is a plan view of the four-way valve, FIG. 6 is an end view of the valve of FIGS. 3, 4 and 5, FIG. 7 is a plan view of the means for attaching a valve operating rod, FIG. 8 is a section, similar to FIG. 4, illustrating a modified form of valve, FIG. 9 is a partial section illustrating the valve member of the FIG. 8 construction, FIG. 10 is a partial section end view of the valve member of FIG. 9, and FIG. 11 is a top view of the valve member of FIGS. 8, 9 and 10.

DESCRIPTION OF THE PREFERRED EMBODIMENT

Figure 4:
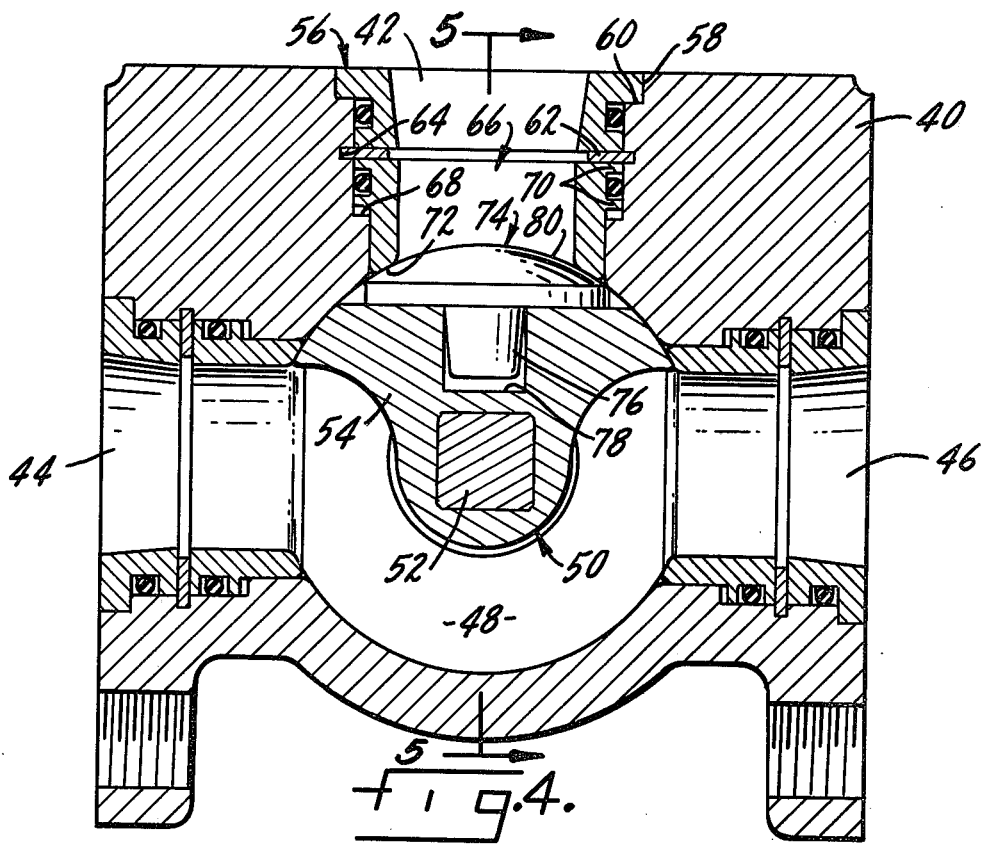
FIG. 4 is an section along plane 4—4 of FIG. 3.

The present invention relates to railroad car air brake systems and in particular to a four-way valve which will be mounted on each individual railway car and replace the current pair of angle cocks, branch pipe T and cut-out cock and dirt collector. Although the four-way valve described may in fact include a dirt collector, as this is considered important by railroads, that has not been shown herein. However, it should be understood that the dirt collector may in fact be a part of the four-way valve or associated with it.

Looking at FIG. 1, the air brake system for a conventional freight car includes a pair of angle cocks indicated at 10 and 12 which are usually connected at opposite ends of the car to the brake pipe 14. A branch pipe T 16 forms a connection between the brake pipe and the dirt collector and cut-out cock 18. A control valve 20 is connected to the dirt collector and cut-out cock 18 as is convention.

FIG. 2 shows the same convention freight car brake system, but with the elimination of the angle cocks, branch pipe T and cut-out cock and dirt collector. All of these components are replaced by a four-way valve 22 which is connected to the brake pipe 24 and to a control valve 26. The four-way valve will normally be placed centrally of the freight car and at a location whereby it is accessible from either side of the car by an operating lever or similar implement. Thus, there is no necessity for the workman to crawl under or between cars to operate an angle cock. The four-way valve will function as an angle cock in that it may shut off air flow in the brake pipe from either direction. It will also function to disconnect the control valve from the brake pipe. There is further a neutral position in the valve wherein there is complete interconnection between the control valve and the brake pipe, which neutral position will be the normal operating position of the valve.

As indicated in FIGS. 3-6, the four-way valve includes a housing 40 having ports 42, 44 and 46. Port 42 will connect to the control valve and ports 44 and 46 will be connected to the brake pipe. The three described ports all are in communication with a generally central and generally cylindrical chamber 48 within which is positioned a valve member 50. Valve member 50 is mounted upon a rod 52 and has the irregular shape particularly illustrated in FIG. 4. Rod 52 will be square in cross section as shown in FIG. 4 and rotation of the rod will rotate the valve member so that it may be positioned opposite any one of the described ports or in the neutral position in which the enlarged portion 54 of the valve member is positioned 180 degrees from the position of FIG. 4. In that position there will be complete communication between the three ports.

The port seal structures for each of the ports are identical and only one will be described in detail. Looking at port 42 there is a seal member 56 having an outwardly-extending flange 58 which is seated within a groove 60 at the exterior of the port adjacent the outer surface of housing 40. Seal 56 provides a means for sealing to the connected air brake piping. Seal ring 56 is also supported by a snap ring 62 positioned within a groove 64 in the wall of the port. Interiorly of snap ring 62 is a floating seal member 66 which is movable within the space defined between snap ring 62 and a shoulder 68 formed in the wall of the port. It should be noted that spaced flanges 70 of seal member 66 span an axial distance less than the distance between the snap ring and shoulder 68, thereby providing a small degree of movement sufficient to adequately form a seal with the valve member as will be described hereinafter. The interior surface of seal ring 66 is rounded or has a somewhat curved shape, indicated at 72, whereby the initial contact between the interior sealing surface and the opposite seal member is adjacent the internal diameter of seal ring to provide a greater pressure differential as explained hereinafter.

Valve member 50 and its portion of irregular shape 54 is a rotatable within cylindrical chamber 48 and carries a seal member 74 along one side thereof. Seal member 74 is shaped somewhat like a mushroom and has a stem 76 positioned within a socket 78 of the valve member and has an exterior generally spherical sealing surface 80 positioned for contact with the sealing rim 72 of seal ring 66. Sealing surface 80 may substantially cover the exterior of seal member 74 or the cap of the mushroom. A pair of coil springs 82 are positioned in sockets 84 in the valve member and are used to urge the seal member outwardly from the valve member and toward the port floating seals.

Rod 52 carries an index member 86 at one side of the housing with the index member being positioned for engagement with an index plate 88. As particularly shown in FIG. 6, index member 86 may have four generally equally spaced notches 90 which will cooperate with a projection 92 on index plate 88 to fix the valve member in one of four positions: a neutral position in which the valve member is opposite the position of FIG. 4 whereby there is complete communication between all three ports; a second position illustrated in FIG. 4 in which there is communication between the brake pipe ports 44 and 46, but no communication with control valve port 42; and third and fourth positions in which either one of the brake pipe ports is closed.

Figure 5:
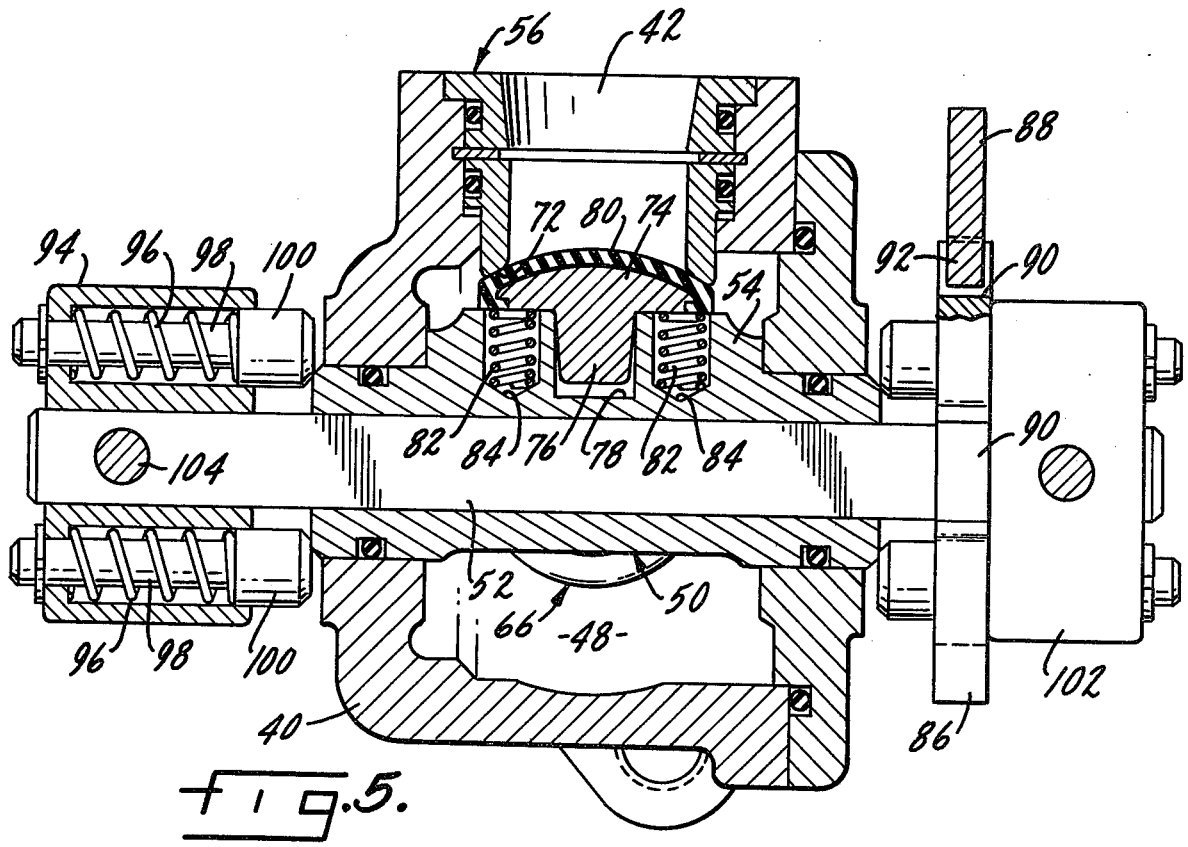
FIG. 5 is a section along plane 5—5 of FIG. 4.

In order to change the position of the valve member, index member 86 must first be released from its engagement with index plate 88. Rod 52 is movable axially relative to valve member 50. However, before the rod can be moved the holding force of the spring units positioned on opposite ends of the rod must first be overcome. Looking at the left end of rod 52, as shown in FIG. 5, rod 52 extends into a small housing 94 which mounts a pair of springs 96 each positioned about a rod 98 having a head 100 which is in contact with valve member 50. Rod 52 will be pinned to housing 94. Thus, the spring units are effective to hold the rod in the position shown. If the rod is to be moved to the left, to release the index member from the index plate, then the springs in spring assembly 102 at the right-hand side of valve housing 40 are compressed. The opposite is true if rod 52 is to be moved to the right. In either event, it is necessary to move the rod axially in order to release the index member from the index plate and thereby permit rotation of the valve member.

The four-way valve may be operable from either side of a railroad car and an operating lever may be attached to either side of rod 52. Looking, at FIG. 7, a threaded bolt 104 extends through housing 94 to attach a yoke 106 to rod 52. Rubber washers or the like 108 may be used in the assembly as is conventional in railroad practice to accomodate axial misalignment. Yoke 106 can be used to first axially move rod 52 in either direction as described and then to cause rotation of the rod to change the position of the valve member. The yoke is attached to a suitable operating lever 110 by a pin connection 112.

Of particular advantage in the construction shown is the sealing arrangement between the valve member and floating seal 66. There will be a seal at the port regardless of pressure differentials between air within the port and air within chamber 48. Assume that pressure within chamber 48 is greater than pressure within port 42, and assuming the valve is in the position of FIG. 4, such pressure will leak around the valve member and be effective upon the underside of seal member 74 urging it outwardly into sealing contact with rim 72 of floating seal 66. Springs 82 will assist in providing a tight seal. Outward movement of seal 66 is limited by snap ring 62.

On the other hand, if pressure at port 42 is greater than pressure within chamber 48, there still will be an effective seal. The pressure responsive area of floating seal ring 66, which is effectively its outer diameter, is greater than the pressure responsive exposed area of mushroom seal surface 80 with the result that the floating seal ring will be urged inwardly toward seal member 74. Springs 82 will urge seal member 74 outwardly and air pressure will urge floating seal ring 66 inwardly. Thus, again the seal will be tight and effective. The relationship between the outer diameter of floating seal 66 and the exposed surface of seal member 74 is important to insure that the described air pressure differential will provide a firm seal with the valve member.

FIGS. 8-11 show a modified form of valve member and seal member. A housing 120 may have the same port arrangement as disclosed in connection with the above-described embodiment, one of such ports being indicated at 122. Seal 56 is not shown in the FIG. 8 embodiment, but such a seal or one similar thereto will customarily be positioned within the port. Seal member 66 is the same in the FIG. 8-11 embodiment as in the above-described embodiment and is again held in position by a suitable snap ring 62.

The valve member, which is indicated at 124, has a pair of spaced flanges 126 and 128 which bear against interior housing walls 130 and 132, respectively, thereby positioning the valve member within the housing. The valve member includes a circular outwardly-extending annular wall 134 which defines a pocket 136 within which is mounted a seal member 138. The seal member 138 will function as the seal member 74 in that depending upon the position of the seal member relative to the several ports, the flow of air can be controlled to shut off air flow in the brake pipe from either direction and to disconnect the control valve from the brake pipe.

Seal member 138, particularly illustrated in FIG. 10, is outwardly-biased by a washer spring 140 which functions in the same manner as springs 82 in the above described construction. The seal member includes an upside-down cup-shaped member 142 having an exterior sealing surface 144 which will function in the same manner as sealing surface 80. Cup member 142 may be made entirely of an elastomeric material or it may be made of metal or some similar material since it will be coacting with the floating seal described above. The interior of cup-shaped member 142 has a metal insert 146 which will provide structural support. The seal construction illustrated in FIG. 10 will operate in the same manner as the seal of FIGS. 3-7. Similarly, the FIG. 8-11 construction will have the same advantages. In addition, it provides a somewhat simpler mechanical configuration when contrasted with the FIG. 3-7 embodiment.

Whereas the preferred form of the invention has been shown and described herein, it should be realized that there may be many modifications, substitutions and alterations thereto.

The embodiment of the invention in which an exclusive property or privilege is claimed are defined as follows:

1. A four-way valve for use in a railroad air brake system including a housing having a generally cylindrical internal chamber and ports in communication therewith, two of said ports being adapted for connection to a railroad car brake pipe with an intermediate port being adapted for connection to the railroad car air brake system, a valve member movable about the axis of said chamber between a plurality of positions, there being a position to close each port and a neutral position in which all ports are in communication with said chamber, the improvement comprising a seal member having a spherical sealing surface carried by said valve member, spring means urging said seal member and sealing surface thereof outwardly of said valve member and toward said ports, and seal means for each port including a floating seal ring within each port and positioned for contact with said valve member seal member sealing surface, said floating seal rings being movable axially relative to said valve member seal member, with the outer diameter of each floating seal ring being greater than the pressure responsive sealing surface of said valve member seal member whereby if the pressure upon said floating seal ring from exteriorly of said four-way valve is greater than the pressure within said four-way valve chamber, a floating seal ring will be urged by said greater pressure into firm sealing contact with said valve member seal member, an operating rod forming a portion of said valve member and extending outwardly therefrom, from opposite sides thereof, from said housing, and spring means attached to opposite ends of said rod for holding said rod in a fixed axial position relative to said valve member.

2. The structure of claim 1 further characterized in that said seal member includes a support and an outer spherical sealing surface, said spring means urging said support outwardly of said valve member.

3. The structure of claim 1 further characterized by and including an index plate associated with the exterior of said housing and an index number attached to said rod and movable therewith, with said index plate and index member being arranged to latch said valve member in one of said positions.

4. The structure of claim 3 further characterized in that said rod is axially movable relative to said valve member for releasing said index member from said index plate to permit rotation of said rod and valve member to change the position of said valve member.

* * * * *